United States Patent
Erhardt et al.

(10) Patent No.: US 7,304,673 B2
(45) Date of Patent: Dec. 4, 2007

(54) IMAGE SENSOR ARRAY WITH SUBSTITUTIONAL CIRCUIT DISTRIBUTION

(75) Inventors: Herbert J. Erhardt, Webster, NY (US); David N. Nichols, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 735 days.

(21) Appl. No.: 10/691,047

(22) Filed: Oct. 22, 2003

(65) Prior Publication Data

US 2005/0088552 A1   Apr. 28, 2005

(51) Int. Cl.
- *H04N 3/14* (2006.01)
- *H04N 5/335* (2006.01)
- *H04N 9/04* (2006.01)
- *H04N 9/83* (2006.01)

(52) U.S. Cl. .................. 348/275; 348/245; 348/246
(58) Field of Classification Search ................ 348/275, 348/243, 245, 246
See application file for complete search history.

(56) References Cited

U.S. PATENT DOCUMENTS

| | | | |
|---|---|---|---|
| 5,416,516 A * | 5/1995 | Kameyama et al. | 348/246 |
| 6,819,360 B1 * | 11/2004 | Ide et al. | 348/340 |
| 6,970,193 B1 * | 11/2005 | Kidono et al. | 348/245 |
| 6,980,242 B2 * | 12/2005 | Funakoshi et al. | 348/245 |
| 2003/0030738 A1 | 2/2003 | Clynes et al. | |
| 2004/0095488 A1 * | 5/2004 | Rambaldi et al. | 348/246 |

FOREIGN PATENT DOCUMENTS

GB    2 328 338 A    2/1999

\* cited by examiner

*Primary Examiner*—Lin Ye
*Assistant Examiner*—Gevell Selby
(74) *Attorney, Agent, or Firm*—Peyton C. Watkins

(57) ABSTRACT

An image sensor includes a plurality of photosensitive sites which convert incident light into a charge for forming a bounded array of active imaging pixels; one or more substitutional pixels sites arranged in predetermined locations and interspersed amongst the boundary of the array of active imaging pixels; wherein the substitutional pixels are of a different design from the active imaging pixels which provides data, information or function different from the active pixels for improving performance, operation, manufacture, and/or assembly of the image sensor.

14 Claims, 3 Drawing Sheets

US 7,304,673 B2

IMAGE SENSOR ARRAY WITH SUBSTITUTIONAL CIRCUIT DISTRIBUTION

FIELD OF THE INVENTION

The invention relates generally to the field of image sensors having an array of active imaging pixels, and in particular to interspersing substitutional pixels that are substantially different in design from the imaging pixels in the array of pixels for providing information or functions and the like for improving performance.

BACKGROUND OF THE INVENTION

Typically, image sensors are manufactured within a certain tolerance specification in which a few pixels have somewhat undesirable characteristics. These pixels are commonly referred to as "defective pixels" because, although they are operational, they do not have the same desired performance characteristics as the other pixels. Given a sufficiently low density, these defective pixels do not substantially degrade the quality of a captured image because they are typically replaced by calculated substitute values, which closely approximate the value if the pixel was not defective.

One such technique is to replace the defective pixel value with the average of a predetermined number of nearest neighbor values. This predetermined number of nearest neighbor could be two immediate adjacent pixels or four immediate adjacent pixels.

It is also instructive to note that image sensors are also formed from an array of identical cells (typically four immediate adjacent pixels) so that the imaging characteristics of the sensor are substantially uniform across the array. Design of these cells are often a trade-off or compromise of several competing imaging performance parameters, such as read-out rate, photosensitivity, and photo-response non-uniformity.

Consequently, a technique or method is needed to provide improvements in a specific imaging performance parameter without substantial degradation of other aspects. One such improvement is to use the knowledge that defective pixels do not substantially degrade image quality for enhancing other imaging parameters.

SUMMARY OF THE INVENTION

The present invention is directed to overcoming one or more of the problems set forth above. Briefly summarized, according to one aspect of the present invention, the invention resides in an image sensor including (a) a plurality of photosensitive sites which convert incident light into a charge for forming a bounded array of active imaging pixels; (b) one or more substitutional pixel sites arranged in predetermined locations and interspersed amongst the boundary of the array of active imaging pixels; wherein the substitutional pixels are of a different design from the active imaging pixels which provides data, information or function different from the active pixels for improving performance, operation, manufacture, and/or assembly of the image sensor.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantage of improving specific aspects of the performance, operation, manufacture, and/or assembly of the image sensor without degrading other performance aspects of all pixels.

DETAILED DESCRIPTION OF THE INVENTION

Before discussing the present invention, it is instructive to have a common understanding of image sensor terminology, such as "active" which is used or mated with other terms for describing entirely different qualities. In this regard, image sensors may be formed using a CCD (charge coupled device) technology or using a CMOS (complementary metal oxide semiconductor) technology. Image sensors made with CMOS technology use an "active element" such as a transistor in each pixel. This is typically referred to as an "active CMOS" image sensor. In active CMOS imagers, one or more active elements in the pixel converts the signal charge into a voltage, thereby providing a voltage which is representative of the light intensity upon that pixel. Regardless of the technology, the array of pixels that actually captures the incident light for converting it to charge is referred to as "active imaging pixels." It is noted that image sensors also contains "dark reference pixels" that are typically disposed in a spaced-apart relationship from the active imaging pixels. These pixels are used for calibration purposes, and are mentioned herein so that active imaging pixels are clearly distinguished therefrom.

Figure 1:
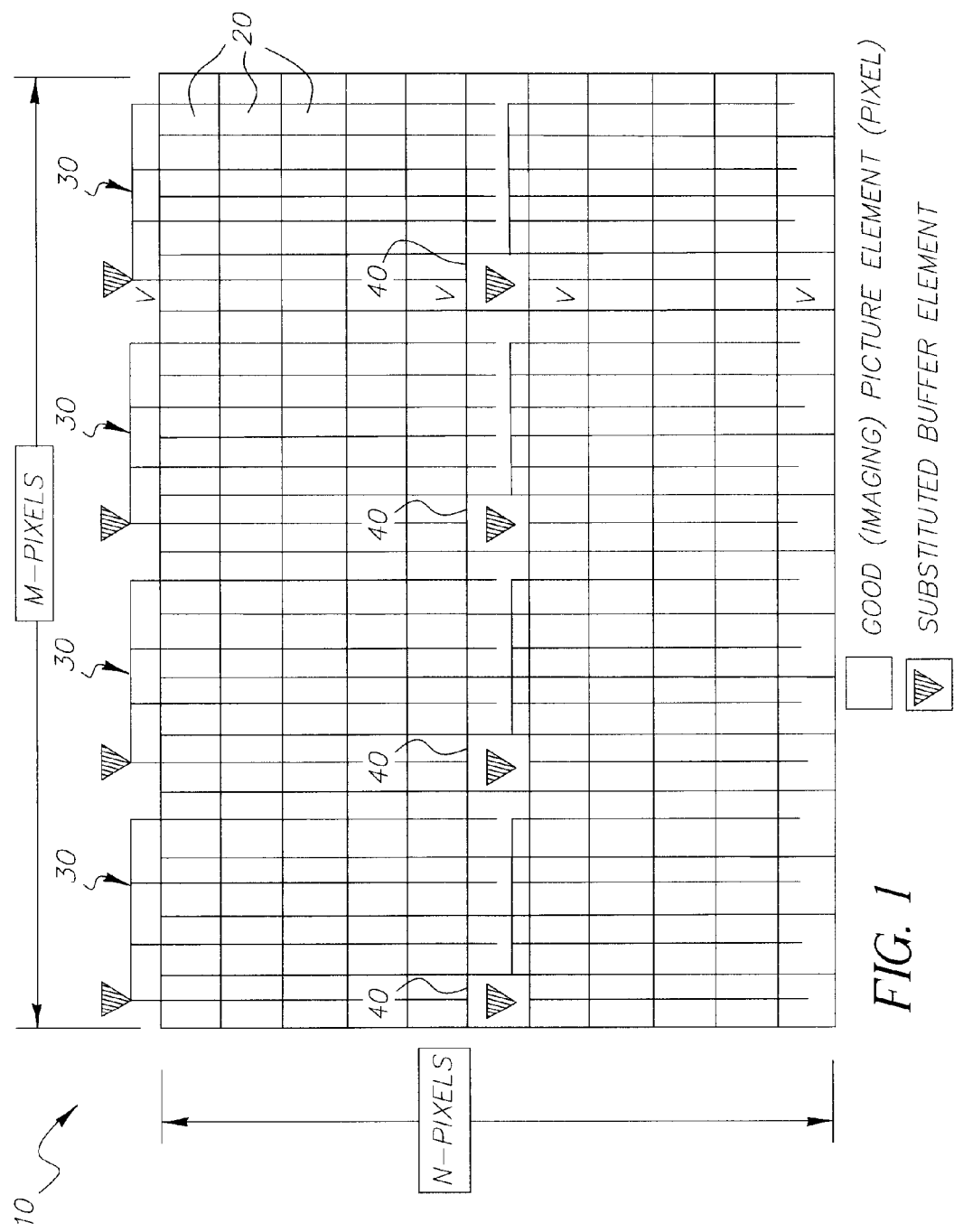
FIG. 1 is a top view of the image sensor of the present invention.

Now referring to FIG. 1, there is shown a top view of an image sensor 10 of the present invention. In this regard, a plurality of pixels 20 is arranged in an array of N by M pixels for forming a bounded active imaging array or area, where N and M are any predetermined number of pixels such as, for example, 200 to 4,000. Each pixel 20 captures incident light that is converted into a charge representative of the intensity of the incident light. For clarity, it is noted that these pixels collectively form the active imaging pixels. In such devices, the active imaging pixels 20 are energized for operation via a plurality of supply buses 30 that are energized to a predetermined voltage level as is well known in the art.

Still referring to FIG. 1, a predetermined number of the active imaging pixels 20 are replaced by pixels 40 that are used for an entirely or substantially different purpose than the active imaging pixels. These pixels 40 are referred to hereinafter as substitutional pixels. These substitutional pixels 40 are used to provide data, information and/or function different from the active pixels 20 for improving performance, operation, manufacture, and/or assembly of the image sensor 10. For example, the substitutional pixels 40 may be used as amplifier circuits or buffer circuits for improving distribution of current or voltage across the array of active imaging pixels. Such amplifier circuits and buffer circuits are well known in the art and are not described in detail herein. Such amplifier circuits or buffer circuits may also be used for improving signal integrity within or across the array of pixels. For example, in large arrays, the voltage provided by the active elements in the pixel must be supplied over a long metal output line that has some resistance and capacitance. For large arrays, the resistance and capacitance of the metal line may increase the time required to establish that voltage along the entire line. In such a case, either the operating speed of the imager is compromised, or a non-uniformity in photo response may occur as a result of the capacitance and resistance of the long metal line. In this case, a buffer amplifier may be used in a substitutional pixel to decrease the time required to establish the voltage along the entire line.

In addition, these substitutional pixels may be used for determining alternate image parameters including alternate color, infrared constituents or other photo-metric parameters. For example, a filter that allows only infrared light through to the photosensitive region of the pixel may be placed over a pixel so that a sampling of the infrared component of the incident radiation may be obtained. In a CCD image sensor, particularly those for which the pixel array is formed in a well of conductivity type opposite the substrate, degradation of the maximum charge handling capacity of some pixels may be degraded due the inability to maintain a uniform ground potential within the well due to its resistivity. The substitutional pixel sites may be used to provide a ground contact within the image sensor to maintain a more uniform ground potential in the well. The substitutional pixels may also be used as fiducial elements, which can be used for a mechanism for aligning the image sensor. Finally, such substitutional pixels may provide dark reference levels for image processing. Dark reference signals are taken with the pixel covered in some manner so that it is not exposed to light. The value from this "dark" exposure is then used for calibration during image processing. This dark reference signal from the substitutional pixels can be in lieu of or in additional to the usual dark reference pixel values.

Figure 2:
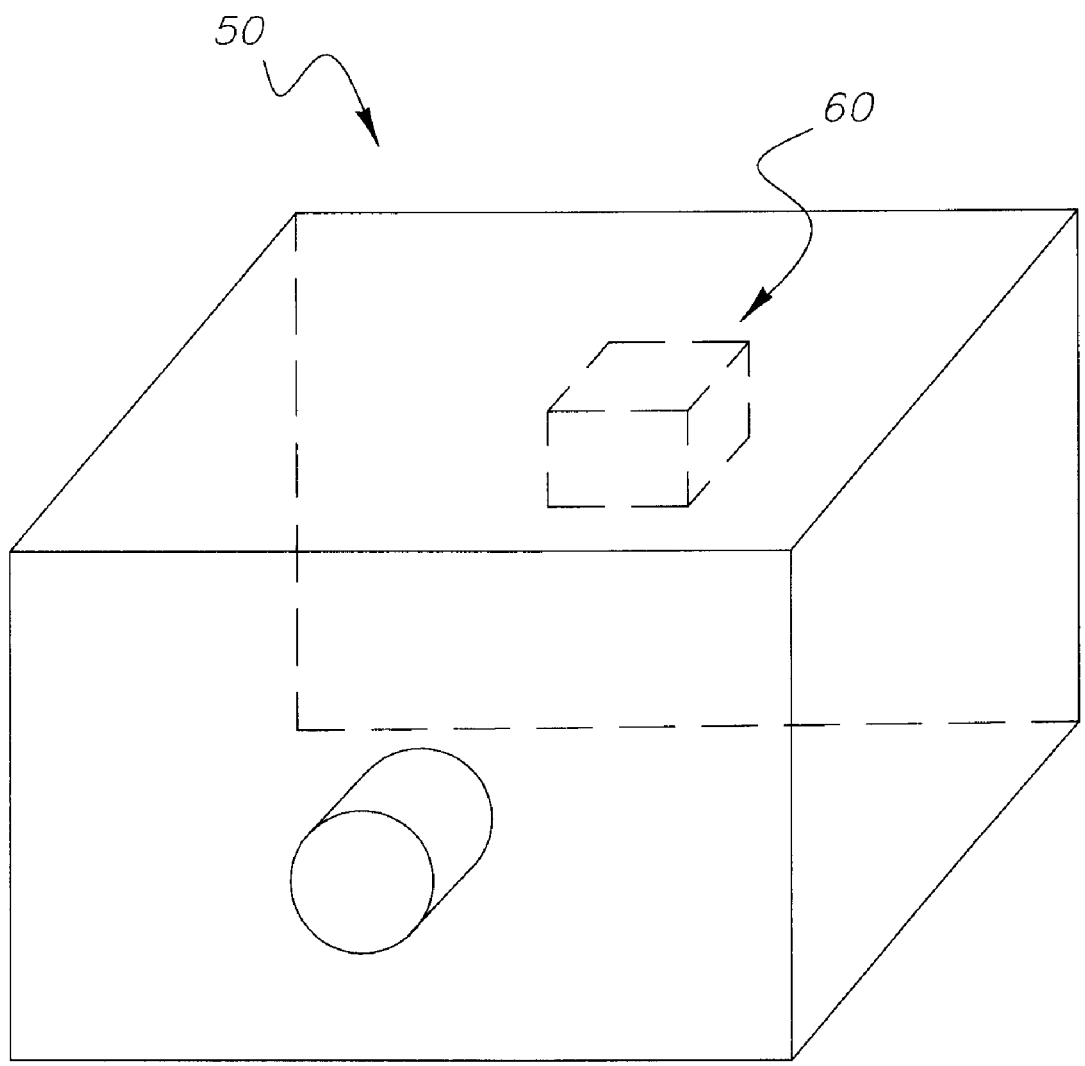
FIG. 2 is a camera for implementing a preferred commercial embodiment for the image sensor of FIG. 1.
Figure 3:
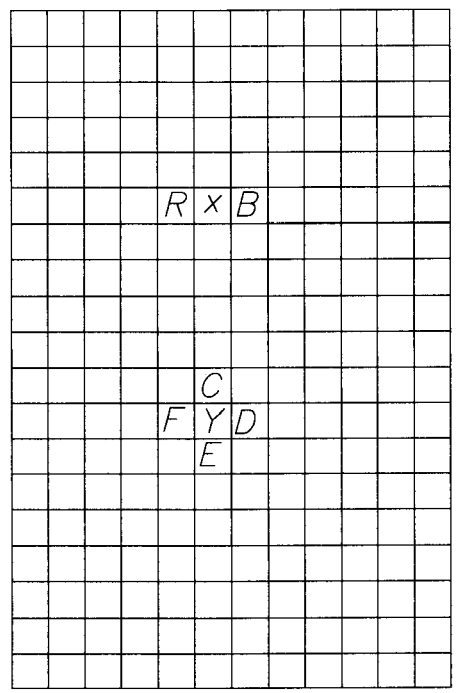
FIG. 3 is an illustration of a technique for computing an average of nearest neighbors that may be used as a pixel value for the substitutional pixels.

Referring to FIG. 2, there is shown a digital camera 50 for implementing the image sensor 10 of the present invention in a typical commercial embodiment to which an ordinary consumer is accustomed. The camera 50 also includes a mechanism, preferably an algorithm, for correcting the image created by the plurality of active imaging pixels by providing a signal level for an image site at a substitutional pixel location. The processor 60 of the camera 50 may compute this correction value by well-known programming techniques. This algorithm, for example, could be by computing the average of a predetermined number of nearest neighbors. Referring to FIG. 3, the nearest neighbors could be the two immediately adjacent nearest neighbors (A and B) of the pixel of interest (X) or the four immediately adjacent nearest neighbors (C, D, E and F) of the pixel of interest (Y).

Figures 4A, 4B:
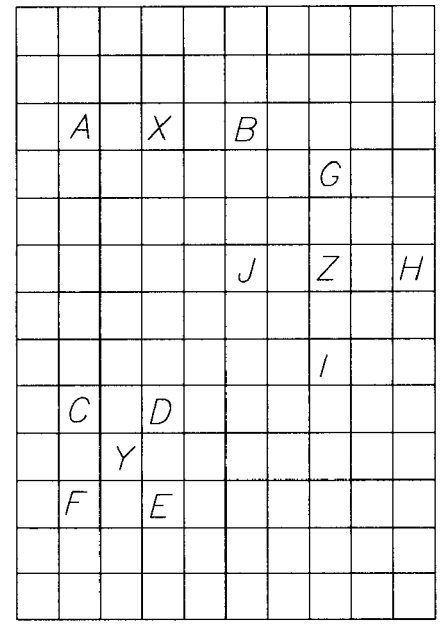
FIG. 4a is an illustration of a color filter array, more specifically a Bayer pattern.
FIG. 4b is an illustration of choosing a nearest neighbor pixel.

For a color image sensor, color filters are typically arranged on top of the active pixels in an alternating RGBG pattern, known as the Bayer pattern, where R indicates a red filter, B a blue filter, and G a green filter, as shown in FIG. 4a. In this case, the correction value could use the closest neighboring color pixels. Referring to FIG. 4b, the nearest neighbors could be A and B for a green pixel of interest X or neighbors C, D, E, F for green pixel of interest Y. For a blue pixel of interest Z, the nearest neighbors could be G, H, I, J. A similar calculation could be done for red pixels with the appropriate coordinate transformation. One will note, that other more elaborate correction algorithms could also be used.

The invention has been described with reference to a preferred embodiment. However, it will be appreciated that variations and modifications can be effected by a person of ordinary skill in the art without departing from the scope of the invention.

PARTS LIST 10 image sensor
20 pixels
30 supply buses
40 substitutional pixels
50 digital camera
60 processor

What is claimed is:

1. An image sensor comprising:
   (a) a plurality of photosensitive sites each comprising circuitry designed to convert incident light into a charge, wherein the plurality of photosensitive sites form a bounded array of active imaging pixels; and
   (b) one or more substitutional pixel sites arranged in predetermined locations and interspersed within the bounded array of active imaging pixels;
   wherein each active imaging pixel located at the one or more predetermined substitutional pixel sites is replaced with one or more pixels each comprising circuitry of a different design from the active pixels where the one or more substitutional pixels provides data, information or function different from the active imaging pixels for improving performance, operation, manufacture, and/or assembly of the image sensor.

2. The image sensor as in claim 1, wherein at least one of the one or more substitutional pixels is an amplifier circuit or a buffer circuit for improving distribution of current or voltage across the array of pixels.

3. The image sensor as in claim 1, wherein at least one of the one or more substitutional pixels is an amplifier circuit or a buffer circuit for improving signal integrity within or across the array of pixels.

4. The image sensor as in claim 1, wherein at least one of the one or more substitutional pixels has response characteristics for determining alternate image parameters including alternate color, infrared constituents or other photo-metric parameters.

5. The image sensor as in claim 1, wherein at least one of the one or more substitutional pixels is a fiducial element which can be used for a mechanism for aligning the image sensor.

6. The image sensor as in claim 1, wherein at least one of the one or more substitutional pixels provides a ground contact.

7. A camera comprising:
   (a) an image sensor comprising:
      (a1) a plurality of photosensitive sites each comprising circuitry designed to convert incident light into a charge, wherein the plurality of photosensitive sites form a bounded array of active imaging pixels; and
      (a2) one or more substitutional pixel sites arranged in predetermined locations and interspersed within the bounded array of active imaging pixels;

wherein each active imaging pixel located at the one or more predetermined substitutional pixel sites is replaced with one or more substitutional pixels each comprising circuitry of a different design from the active imaging pixels where the one or more substitutional pixels provides data information and/or function different from the active imaging pixels for improving performance, operation, manufacture, and/or assembly of an imaging system; and (b) a mechanism for correcting an image created by the bounded array of active imaging pixels by providing a signal level for an image site to at least one substitutional pixel.

8. The image sensor as in claim 7 wherein the mechanism for correcting and providing the signal level to the at least one substitutional pixel is done using nearest neighbor interpolation methods.

9. A camera comprising:
(a) an image sensor comprising:
  (a1) a plurality of photosensitive sites each comprising circuitry designed to convert incident light into a charge, wherein the plurality of photosensitive sites form a bounded array of active imaging pixels; and
  (a2) one or more substitutional pixel sites arranged in predetermined locations and interspersed within the bounded array of active imaging pixels;
  wherein each active imaging pixel located at the one or more predetermined substitutional pixel sites is replaced with one or more substitutional pixels each comprising circuitry of a different design from the active imaging pixels where the one or more substitutional pixels provides data, information and/or function different from the active imaging pixels for improving performance, operation, manufacture, and/or assembly of an imaging system.

10. The camera as in claim 9, wherein at least one of the one or more substitutional pixels is an amplifier circuit or buffer circuit for improving distribution of current or voltage across the array of pixels.

11. The camera as in claim 9, wherein at least one of the one or more substitutional pixels is an amplifier circuit or a buffer circuit for improving signal integrity within or across the array of pixels.

12. The camera as in claim 9, wherein at least one of the one or more substitutional pixels has response characteristics for determining alternate image parameters including alternate color, infrared constituents or other photo-metric parameters.

13. The camera as in claim 9, wherein at least one of the one or more substitutional pixels is a fiducial element which can be use for a mechanism for aligning the image sensor.

14. The camera as in claim 9, wherein at least one of the one or more substitutional pixels provides a ground contact.

* * * * *

UNITED STATES PATENT AND TRADEMARK OFFICE
CERTIFICATE OF CORRECTION

PATENT NO. : 7,304,673 B2  Page 1 of 1
APPLICATION NO. : 10/691047
DATED : December 4, 2007
INVENTOR(S) : Herbert J. Erhardt et al.

It is certified that error appears in the above-identified patent and that said Letters Patent is hereby corrected as shown below:

| | |
|---|---|
| Column 4, line 11 of claim 1 | after "more" and before "pixels" insert --substitutional--. |
| Column 4, line 12 of claim 1 | after "active" and before "pixels" insert --imaging--. |
| Column 5, claim 7, line 6 | delete "data" and insert --data,--. |
| Column 6, claim 13, line 24 | delete "use" and insert --used--. |

Signed and Sealed this

First Day of July, 2008

JON W. DUDAS
*Director of the United States Patent and Trademark Office*